United States Patent
Blanchet (10) Patent No.: US 10,295,122 B2
(45) Date of Patent: May 21, 2019

(54) DISTRIBUTED HYDROGEN REFUELING CASCADE METHOD AND SYSTEM

(71) Applicant: Nuvera Fuel Cells, LLC, Billerica, MA (US)

(72) Inventor: Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 16/102,778

(22) Filed: Aug. 14, 2018

(65) Prior Publication Data

US 2018/0363851 A1    Dec. 20, 2018

Related U.S. Application Data

(62) Division of application No. 14/291,760, filed on May 30, 2014, now Pat. No. 10,077,871.

(Continued)

(51) Int. Cl.
*F17C 5/06* (2006.01)

(52) U.S. Cl.
CPC ........ *F17C 5/06* (2013.01); *F17C 2205/0134* (2013.01); *F17C 2205/035* (2013.01); *F17C 2205/0326* (2013.01); *F17C 2205/0329* (2013.01); *F17C 2205/0335* (2013.01); *F17C 2205/0338* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/0161* (2013.01);

(Continued)

(58) Field of Classification Search
CPC .... F17C 5/06; F17C 5/007; F17C 6/00; F17C 7/00; F17C 2227/043
See application file for complete search history.

(56) References Cited

U.S. PATENT DOCUMENTS 3,547,141 A    12/1970  Alexander et al.
3,719,196 A    3/1973   McJones
(Continued)

FOREIGN PATENT DOCUMENTS

EP    1777454 A1    4/2007
JP    2004-293752 A    10/2004
(Continued)

OTHER PUBLICATIONS

Notice of Reasons for Rejection issued in Japanese Patent Application No. 2016-517057, dated Feb. 28, 2018, with English translation (9 pages).

(Continued)

*Primary Examiner* — Paul R Durand
*Assistant Examiner* — Randall A Gruby
(74) *Attorney, Agent, or Firm* — Finnegan, Henderson, Farabow, Garrett & Dunner LLP (57) ABSTRACT

The present disclosure is directed to a compressed fuel dispensing station having a compressor configured to compress a fuel source, a plurality of fuel dispensing units, at least one low pressure compressed fuel reservoir fluidly connected to the fuel compressor and the plurality of fuel dispensing units, and a plurality of high pressure compressed fuel reservoirs, wherein each high pressure compressed fuel reservoir is fluidly connected to the fuel compressor and at least one fuel dispensing unit.

13 Claims, 5 Drawing Sheets

Related U.S. Application Data (60) Provisional application No. 61/829,299, filed on May 31, 2013.

(52) U.S. Cl.
CPC ............... *F17C 2225/0123* (2013.01); *F17C 2225/036* (2013.01); *F17C 2227/0164* (2013.01); *F17C 2227/0185* (2013.01); *F17C 2227/043* (2013.01); *F17C 2260/025* (2013.01); *F17C 2265/065* (2013.01); *F17C 2270/016* (2013.01); *F17C 2270/0134* (2013.01); *F17C 2270/0139* (2013.01); *F17C 2270/0147* (2013.01); *F17C 2270/0184* (2013.01); *Y02E 60/321* (2013.01); *Y02E 60/324* (2013.01); *Y02P 90/45* (2015.11)

(56) References Cited

U.S. PATENT DOCUMENTS

| | | | |
|---|---|---|---|
| 5,315,831 A | 5/1994 | Goode et al. | |
| 5,406,988 A | 4/1995 | Hopkins | |
| 5,409,046 A * | 4/1995 | Swenson | F17C 9/02 141/11 |
| 5,454,408 A | 10/1995 | DiBella et al. | |
| 5,538,051 A | 7/1996 | Brown | |
| 5,673,735 A | 10/1997 | Crvelin et al. | |
| 5,884,675 A | 3/1999 | Krasnov | |
| 5,924,291 A | 7/1999 | Weiler et al. | |
| 6,085,528 A | 7/2000 | Woodall et al. | |
| 6,439,278 B1 | 8/2002 | Krasnov | |
| 6,655,422 B2 | 12/2003 | Shock | |
| 6,792,981 B1 | 9/2004 | Manning et al. | |
| 6,810,925 B2 * | 11/2004 | Graham | B60S 5/02 141/18 |
| 7,059,364 B2 | 6/2006 | Kountz et al. | |
| 7,069,730 B2 | 7/2006 | Emmer et al. | |
| 7,284,575 B2 | 10/2007 | Gram et al. | |
| 7,316,859 B2 | 1/2008 | Christie et al. | |
| 7,415,995 B2 | 8/2008 | Plummer et al. | |
| 7,568,507 B2 | 8/2009 | Farese et al. | |
| 7,621,302 B2 | 11/2009 | Shock et al. | |
| 7,987,877 B2 * | 8/2011 | Bavarian | F17C 7/00 137/255 |
| 8,122,918 B2 | 2/2012 | Handa | |
| 8,156,970 B2 | 4/2012 | Farese et al. | |
| 8,286,675 B2 * | 10/2012 | Farese | F17C 5/007 141/197 |
| 8,360,112 B2 | 1/2013 | Allidieres et al. | |
| 8,594,954 B2 | 11/2013 | Macron et al. | |
| 8,607,830 B2 * | 12/2013 | White | F17C 5/02 141/11 |
| 8,899,278 B2 * | 12/2014 | Cohen | F17C 7/02 141/104 |
| 8,978,715 B2 * | 3/2015 | Allidieres | F17C 5/06 141/1 |
| 9,074,730 B2 | 7/2015 | Cohen | |
| 9,151,448 B2 * | 10/2015 | Cohen | F17C 5/06 |
| 9,163,785 B2 | 10/2015 | Mackey | |
| 9,316,215 B2 | 4/2016 | Mackey | |
| 9,346,662 B2 | 5/2016 | Van Vliet et al. | |
| 9,442,495 B2 | 9/2016 | Van Doorn | |
| 9,458,968 B2 * | 10/2016 | Gupta | F17C 5/007 |
| 9,618,159 B2 | 4/2017 | Gouvêa et al. | |
| 9,644,791 B2 | 5/2017 | Nettis et al. | |
| 9,663,345 B2 | 5/2017 | Mackey | |
| 9,714,739 B2 * | 7/2017 | Killeen | F17D 3/00 |
| 9,719,634 B2 | 8/2017 | Verghade et al. | |
| 9,739,419 B2 | 8/2017 | Donnelly et al. | |
| 9,759,382 B2 | 9/2017 | Adler et al. | |
| 9,759,383 B2 | 9/2017 | Cajiga et al. | |
| 9,765,933 B2 | 9/2017 | Lambrix et al. | |
| 10,145,512 B2 * | 12/2018 | Barker | F17C 5/007 |
| 2002/0053365 A1 | 5/2002 | Mutter | |
| 2003/0164202 A1 | 9/2003 | Graham et al. | |
| 2004/0118476 A1 | 6/2004 | Borck | |
| 2005/0000802 A1 | 1/2005 | Hobbs | |
| 2005/0016185 A1 | 1/2005 | Emmer et al. | |
| 2006/0118575 A1 | 6/2006 | Boyd et al. | |
| 2007/0034283 A1 | 2/2007 | Plummer et al. | |
| 2007/0079891 A1 | 4/2007 | Farese et al. | |
| 2008/0000542 A1 | 1/2008 | Cohen et al. | |
| 2008/0209916 A1 | 9/2008 | White | |
| 2009/0151427 A1 | 6/2009 | Thompson et al. | |
| 2009/0151809 A1 | 6/2009 | Balasubramanian et al. | |
| 2009/0229701 A1 | 9/2009 | Allidieres et al. | |
| 2009/0250138 A1 | 10/2009 | Bavarian et al. | |
| 2010/0040926 A1 | 2/2010 | Blanchet et al. | |
| 2010/0193070 A1 | 8/2010 | Allidieres | |
| 2012/0111447 A1 | 5/2012 | Mori et al. | |
| 2012/0130549 A1 | 5/2012 | Fjalestad et al. | |
| 2012/0216910 A1 | 8/2012 | Inagi et al. | |
| 2012/0318403 A1 | 12/2012 | Cohen et al. | |
| 2013/0112313 A1 | 5/2013 | Donnelly et al. | |
| 2013/0126038 A1 | 5/2013 | Jamal et al. | |
| 2013/0139897 A1 | 6/2013 | Kim et al. | |
| 2013/0248000 A1 | 9/2013 | Killeen et al. | |
| 2013/0337366 A1 | 12/2013 | Blanchet et al. | |
| 2014/0027272 A1 | 1/2014 | Blanchet et al. | |
| 2014/0030615 A1 | 1/2014 | Pollica et al. | |
| 2014/0051007 A1 | 2/2014 | Blanchet et al. | |
| 2014/0110017 A1 | 4/2014 | Gupta | |
| 2014/0261863 A1 | 9/2014 | Cohen et al. | |
| 2014/0261882 A1 | 9/2014 | Lambrix et al. | |
| 2015/0001091 A1 | 1/2015 | Blanchet | |
| 2015/0013831 A1 | 1/2015 | Boyer | |
| 2015/0083273 A1 | 3/2015 | Thiessen | |
| 2015/0107681 A1 | 4/2015 | Killeen et al. | |
| 2015/0211684 A1 | 7/2015 | Santos et al. | |
| 2016/0116113 A1 | 4/2016 | Mrowzinski | |
| 2016/0169449 A1 | 6/2016 | Allidieres | |
| 2016/0245459 A1 | 8/2016 | Grimmer et al. | |
| 2016/0265720 A1 | 9/2016 | Okuno et al. | |
| 2016/0265721 A1 | 9/2016 | Verghade et al. | |
| 2017/0023180 A1 | 1/2017 | Petit et al. | |
| 2017/0102110 A1 | 4/2017 | Lomax et al. | |
| 2017/0146194 A1 | 5/2017 | Youlio et al. | |
| 2017/0234488 A1 | 8/2017 | Lambrix et al. | |
| 2017/0248976 A1 | 8/2017 | Møller et al. | |
| 2017/0254479 A1 | 9/2017 | Petersen et al. | |

FOREIGN PATENT DOCUMENTS

| | | |
|---|---|---|
| JP | 2005-069328 A | 3/2005 |
| JP | 2005-127421 A | 5/2005 |
| JP | 2005-226715 A | 8/2005 |
| JP | 2008-064160 A | 3/2008 |
| WO | WO 2012/123349 A1 | 9/2012 |

OTHER PUBLICATIONS

PCT International Search Report & Written Opinion issued in International Patent Application No. PCT/US2014/040325 dated Mar. 5, 2015.

\* cited by examiner

DISTRIBUTED HYDROGEN REFUELING CASCADE METHOD AND SYSTEM

This is a division of application Ser. No. 14/291,760, filed May 30, 2014, and claims the benefit of U.S. Provisional Application No. 61/829,299, filed May 31, 2013, which is incorporated herein by reference.

The present disclosure relates to distributed hydrogen refueling cascade methods and systems. According to an exemplary embodiment, the system and method can be used for refueling hydrogen powered vehicles.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (e.g., air or oxygen) into electricity and produces heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through the circuit to the cathode and generate electricity, while the protons diffuse through the electrolyte membrane to the cathode. At the cathode, hydrogen protons can react with electrons and oxygen (supplied to the cathode) to produce water and heat.

An electrolysis cell represents a fuel cell operated in reverse. A basic electrolysis cell can function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion.

An electrochemical hydrogen compressor (EHC), for example, can be used to selectively transfer hydrogen from one side of a cell to another. EHCs operating in this manner are sometimes referred to as hydrogen pumps. When the hydrogen accumulated at the second electrode is restricted to a confined space, the electrochemical cell compresses the hydrogen or raises the pressure within the confined space. The maximum pressure or flow rate an individual cell is capable of producing can be limited based on the cell design.

Hydrogen has emerged as a viable alternative to traditional power sources (i.e., fossil fuels). Successful commercialization of hydrogen as an energy carrier and the long-term sustainability of a "hydrogen economy" depends largely on the efficiency and cost-effectiveness of fuel cells, electrolysis cells, hydrogen manipulation/management systems (e.g., EHCs), and hydrogen distribution systems (e.g., dispensing stations). Gaseous hydrogen is a convenient and efficient means of energy storage, usually by pressurized containment. Advantageously, storing hydrogen at high pressure yields high energy density.

However, efficiently dispensing hydrogen to vehicles as part of a fully integrated "hydrogen economy" presents challenges. For example, how is a dispensing station able to handle a high volume of vehicle traffic while still being able to provide each vehicle with a full tank? A hydrogen tank can be rated for a design pressure and filling to the design pressure can maximum the range of the vehicle. In order for a station to be able to handle high volume traffic and ensure each customer receives a full fill, the station must have a large capacity high pressure hydrogen storage tank which can be costly and inefficient.

A typical gaseous fueling station employs a cascade storage system, which divides stored fuel into several separate tanks. For example, one version can employ three tanks—low, mid and high pressure. The vehicle is first connected to the low pressure tank and equalized, then to the mid, and lastly to the high pressure tank. This methodology maximizes the utilization of stored gas by reducing the mass removed from the high pressure tank in order to top off the vehicle. Not only is more energy required to store the gas at the high pressure of the high tank, but the tank itself can be more expensive to manufacture in order to safely store the gas at this high pressure level.

In consideration of the aforementioned circumstances, the present disclosure provides a system and method for distributed hydrogen refueling cascade. One embodiment of the present disclosure is directed to a compressed fuel dispensing station. The compressed fuel dispensing station comprises a compressor configured to compress a fuel source, a plurality of fuel dispensing units, at least one low pressure compressed fuel reservoir fluidly connected to the fuel compressor and the plurality of fuel dispensing units, and a plurality of high pressure compressed fuel reservoirs, wherein each high pressure compressed fuel reservoir is fluidly connected to the fuel compressor and at least one fuel dispensing unit.

In another embodiment, the fuel dispensing station can further comprise at least one medium pressure compressed fuel reservoir fluidly connected to the fuel compressor and the plurality of fuel dispensing units. In another embodiment, the fuel dispensing station can comprise at least one of an electrochemical compressor in fluid communication with the at least one low pressure compressed fuel reservoir and the at least one medium pressure compressed fuel reservoir, wherein the electrochemical compressor is configured to scavenge fuel from the low pressure compressed fuel reservoir and compress and discharge the fuel into the medium pressure compressed fuel reservoir.

In another embodiment, the fuel dispensing station can further comprise at least one compressor in fluid communication with the at least one low pressure compressed fuel reservoir and the at least one high pressure compressed fuel reservoir, wherein the compressor is configured to scavenge fuel from the low pressure compressed fuel reservoir and compress and discharge the fuel into the high pressure compressed fuel reservoir.

In another embodiment, the fuel dispensing station can further comprise at least one compressor in fluid communication with the at least one medium pressure compressed fuel reservoir and the at least one high pressure compressed fuel reservoir, wherein the compressor is configured to scavenge fuel from the medium pressure compressed fuel reservoir and compress and discharge the fuel into the high pressure compressed fuel reservoir.

In another embodiment, the fuel dispensing station can further comprise at least one compressor configured to scavenge fuel from one of the compressed fuel reservoirs and compress and discharge the fuel to one of the compressed fuel reservoirs of higher pressure. In another embodiment, the compressor can be an electrochemical compressor. In another embodiment, the fuel source can include at least one of hydrogen, natural gas and propane. In another embodiment, the compressor can be an electrochemical hydrogen compressor. In another embodiment, each high pressure compressed fuel reservoir can have less volume capacity than the low pressure compressed fuel reservoir.

Another embodiment of the present disclosure is directed to a method of distributing compressed fuel from a dispensing station comprising the steps of compressing a fuel source, distributing the compressed fuel source to at least one low pressure compressed fuel reservoir, and a plurality of high pressure compressed fuel reservoirs, and supplying a fuel at low pressure and then high pressure to a fuel dispensing unit associated with one of the plurality of high pressure compressed fuel reservoirs.

In another embodiment, the method of distributing compressed fuel from a dispensing station can further comprise distributing the compressed fuel source to at least one medium pressure compressed fuel reservoir. In another embodiment, the method of distributing compressed fuel from a dispensing station can further comprise scavenging fuel from one of the compressed fuel reservoirs, compressing the fuel using a compressor, and discharging the fuel to one of the compressed fuel reservoirs of higher pressure.

In another embodiment, the method of distributing compressed fuel from a dispensing station can further comprise supplying a vehicle with a fuel to a full fill level by releasing low pressure fuel then releasing fuel at greater pressure until achieving full fill by releasing high pressure fuel into the vehicle and equalizing. In another embodiment, the fuel source can be distributed to the high pressure compressed fuel reservoirs based on priority and fuel dispensing unit utilization.

The accompanying drawings, which are incorporated in and constitute a part of this specification, illustrate several embodiments of the present disclosure and together with the description, serve to explain the principles of the disclosure.

It is to be understood that both the foregoing general description and the following detailed description are exemplary and explanatory only, and are not restrictive of the disclosure, as claimed.

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
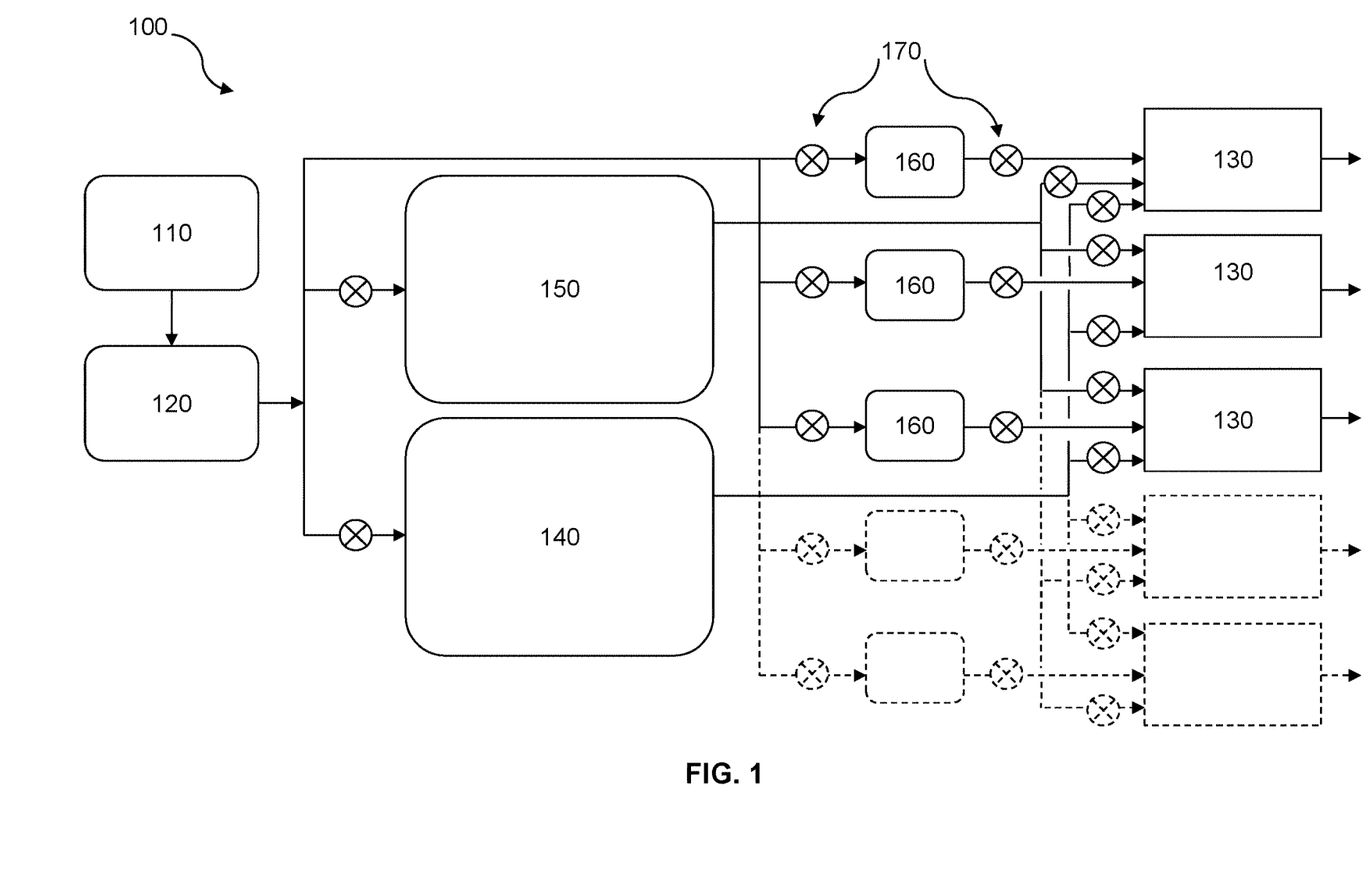
FIG. 1 shows a schematic diagram of a compressed fuel dispensing station, according to an exemplary embodiment.

FIG. 1 shows a schematic diagram of a compressed fuel dispensing station (CFDS) 100, according to an exemplary embodiment. CFDS 100 can comprise a fuel source 110, a compressor 120, one or more fuel dispensing units 130, at least one low pressure compressed fuel reservoir (LPCFR) 140, at least one medium pressure compressed fuel reservoir (MPCFR) 150, and a plurality of high pressure compressed fuel reservoirs (HPCFR) 160.

CFDS 100 can be configured to dispense fuel according to a cascade fueling arrangement. For example, each fuel dispensing unit 130 can be configured to first supply low pressure fuel from LPCFR 140, then supply medium pressure fuel from MPCFR 150, and finally top off a vehicle with high pressure fuel from HPCFR 160 to ensure the vehicle receives a full fill to optimal pressure (i.e., 700 bara to 900 bara).

In other embodiments, a vehicle can be filled starting with medium pressure fuel or even high pressure fuel. This can depend on the initial condition of the vehicle tank and supply. For example, if a vehicle tank is nearly full (i.e., at a high pressure and volume), the low pressure and medium pressure fuel supplies will not be beneficial. Instead, just the high pressure fuel supply can be used to top off the tank.

As shown in FIG. 1, fuel source 110 can be in fluid communication with compressor 120. Compressor 120 can be in fluid communication with LPCFR 140, MPCFR 150, and the plurality of HPCFR 160. One or more of valves 170 can be positioned between these components of CFDS 100 such that flow of a fluid from one component to another can be selectively controlled. For example, each fuel reservoir can be isolated from compressor 120 or other fuel reservoirs.

Fuel source 110 can include a fuel generator, for example a natural gas reforming system or an electrolysis system or unit configured to produce hydrogen gas. In another embodiment, fuel source 110 can include an underground distribution network or reservoir tank configured to receive periodic shipments of hydrogen gas or liquid. It is contemplated that other compressed gas sources can be utilized. For example, fuel source 110 can include a source of natural gas or propane.

Compressor 120 can be configured to receive a fuel from fuel source 110, compress, and discharge the fuel to a fuel reservoir at an increased pressure. According to an exemplary embodiment, compressor 120 can be an electrochemical hydrogen compressor (EHC). In various other embodiments compressor 120 can take the form of a mechanical compressor, ionic-liquid compressor or other comparable compression device.

LPCFR 140 as shown in FIG. 1 can include one or more chambers, reservoirs, or tanks configured to contain a compressed fuel. LPCFR 140 can be configured to be mounted above ground or buried below ground. LPCFR 140 can range in volume from about 1 L to about 5,000 L and can be rated for pressure between about 500 psi and about 15,000 psi.

MPCFR 150 as shown in FIG. 1 can include one or more chambers, tanks, or reservoirs configured to contain a compressed fuel. MPCFR 150 can be configured to be mounted above ground or buried below ground. MPCFR 150 can range in volume from about 1 L to about 5,000 L and can be rated for pressure between about 500 psi and about 15,000 psi.

According to various embodiments, LPCFR 140 and MPCFR 150 can have substantially equal volumes or in alternate embodiments one reservoir can be larger than the other reservoir, depending on the requirements of CFDS 100.

HPCFR 160 as shown in FIG. 1 can include chambers, tanks, or reservoirs configured to contain a compressed fuel. HPCFR 160 can be configured to be mounted above ground or buried below ground. HPCFR 160 can range in volume from about 0.25 L to about 2,000 L and can be rated for pressure between about 1,000 psi and about 15,000 psi. According to an exemplary embodiment, each HPCFR 160 can be smaller in volume than LPCFR 140 and MPCFR 150 to allow for more rapid refill of an HPCFR 160 after a top of a vehicle from the corresponding fuel dispensing unit 130.

Plurality of fuel dispensing units 130 can be configured to dispense compressed fuel to the vehicle, container, or other device configure to receive compressed fuel. Plurality of fuel dispensing units 130 can comprise two or more fuel dispensing devices 130. For example, plurality of fuel dispensing units can comprise 2, 3, 4, 5, 6, 7, 8, 9, 10, 11, 12, 13, 14, 15, 16, 17, 18, 19, 20, or more. Each fuel dispensing unit 130 can be configured to receive and dispense fuel from LPCFR 140, MPCFR 150, and HPCFR 160. Each fuel dispensing unit 130 can contain isolation valves, check valves, flow regulators, and instrumentation configured to safely and efficiently regulate and control the distribution and discharge of the compressed gas. Valves 170 can be isolation valves, check valves, control valves (e.g., pressure control or flow control), or the like. Valves 170 can be manually or automatically operated and may be located within the physical enclosure of the dispensing unit or may be located physically nearer to the associated storage reservoir.

In operation, by dedicating at least one HPCFR 160 for each fuel dispensing unit 130, the discharge of compressor 120 can be prioritized and directed to a specific HPCFR 160 and fuel dispensing unit 130 most in need of compressed fuel. In contrast, a dispensing station having just one high pressure compressed fuel reservoir supplying all the dispensing units does not enable prioritization to the dispensing unit, but only the high pressure compressed fuel reservoir. Another limitation of the single high pressure compressed fuel reservoir can be the extended fill time required to top off the reservoir to full pressure following a vehicle fill up. Whereas, a single HPCFR 160 supplying a single fuel dispensing unit 130 can be topped off in a short period of time (e.g., less than 2 minutes) while a subsequent vehicle is being filled from LPCFR 140 and MPCFR 150.

CFDS 100 is capable of prioritizing HPCFR 160 refilling to enhance a station's ability to handle real-world pump usage profiles. For example, a station having a single high pressure reservoir can be slow to fill a second vehicle if it begins filling immediately following the fill of a first vehicle. In this situation, the high pressure reservoir may not have sufficient time to reach full pressure due to the large volume of the reservoir. As a result, the second vehicle will be slow to receive a full fill. In contrast, CFDS 100 according to the present embodiment can be configured to provide the second vehicle with a full fill because each HPCFR 160 has reduced size and can be quickly filled.

Another advantage of CFDS 100 is the scalability of the station. As shown in FIG. 1, additional HPCFR 160 and fuel dispensing units 130 can be installed as illustrated by the dotted components. CFDS 100 can be scaled up in capacity by adding additional fuel dispensing units 130 and additional HPCFR 160 while utilizing the existing MPCFR 150 and LPCFR 140. In contrast, a dispensing station having a single high pressure reservoir can only support a finite number of pumps depending on the peak volume of traffic at the dispensing station. Therefore, unless the expansion was planned for when the initial high pressure reservoir was sized, scaling up will compromise the traffic capacity and performance of the dispensing station.

Figure 2:
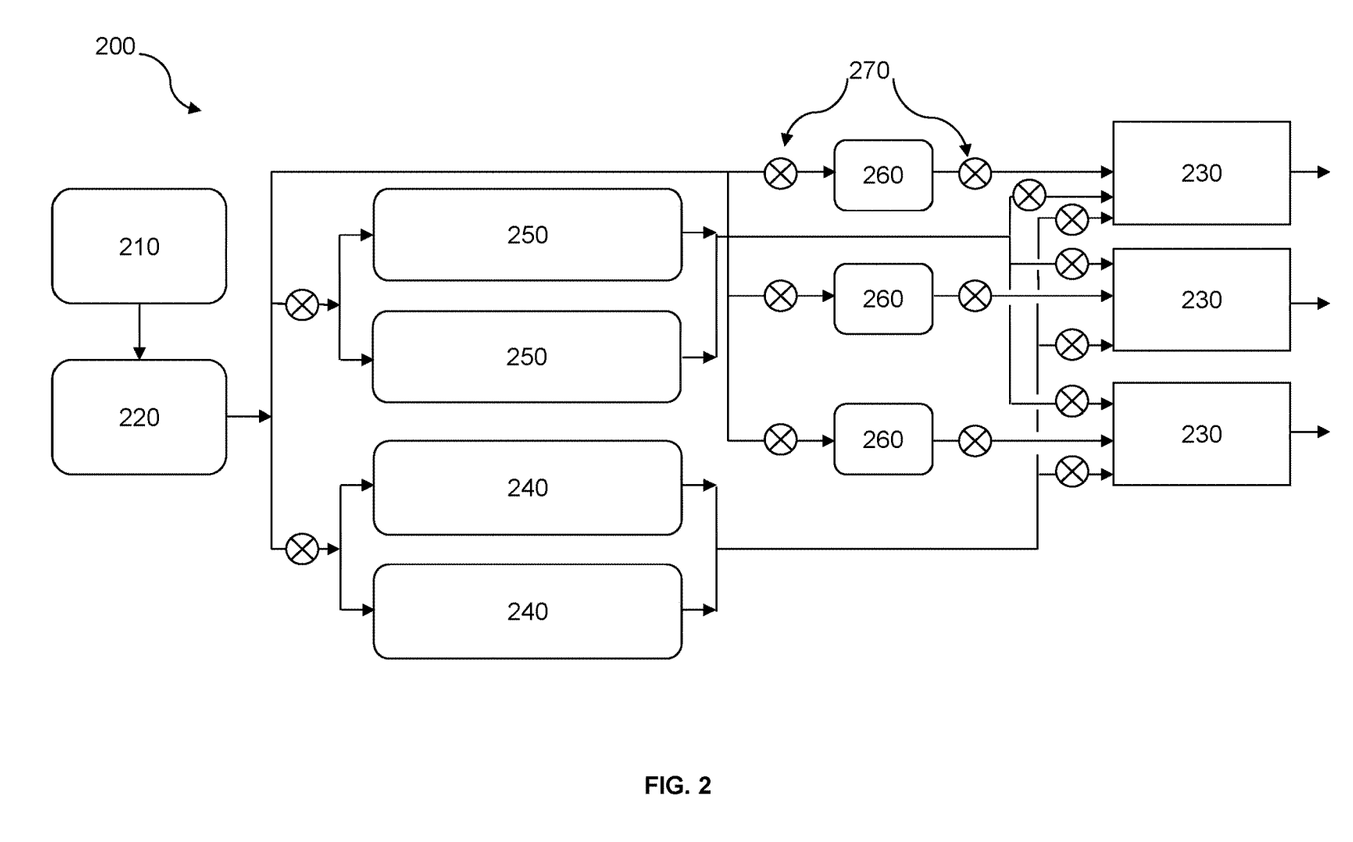
FIG. 2 shows a schematic diagram of a compressed fuel dispensing station, according to an exemplary embodiment.

FIG. 2 shows a schematic diagram of a CFDS 200, according to various embodiments. CFDS 200 can comprise a fuel source 210, a compressor 220, a plurality of fuel dispensing units 230, a plurality of low pressure compressed fuel reservoirs (LPCFR) 240, a plurality of medium pressure compressed fuel reservoir (MPCFR) 250, and a plurality of high pressure compressed fuel reservoirs (HPCFR) 260. As shown in FIG. 2, fuel source 210 can be in fluid communication with compressor 220. Compressor 220 can be in fluid communication with the plurality of LPCFR 220, plurality of MPCFR 250, and plurality of HPCFR 260. In addition, between compressor 220 and all the fuel reservoirs (i.e., LPCFR 240, MPCFR 250, and HPCFR 260) can be a plurality of valves 270 positioned such that each fuel reservoir can be isolated from the compressor and all other fuel reservoirs.

FIG. 2 shows CFDS 200 having two LPCFR 240 and two MPCFR 250 and one HPCFR 260 per fuel dispensing unit 230. However, it is contemplated that more than two LPCFR 240 and more than two MPCFR 250 can be utilized. In addition, it is contemplated that more than one HPCFR 260 per fuel dispensing unit 230 can be utilized. It is contemplated that the volume and number of the LPCFR 240, MPCFR 250, and HPCFR can be varied in consideration of a variety of factors. For example, site space limitations, cost, station capacity, performance, and the like.

Figure 3:
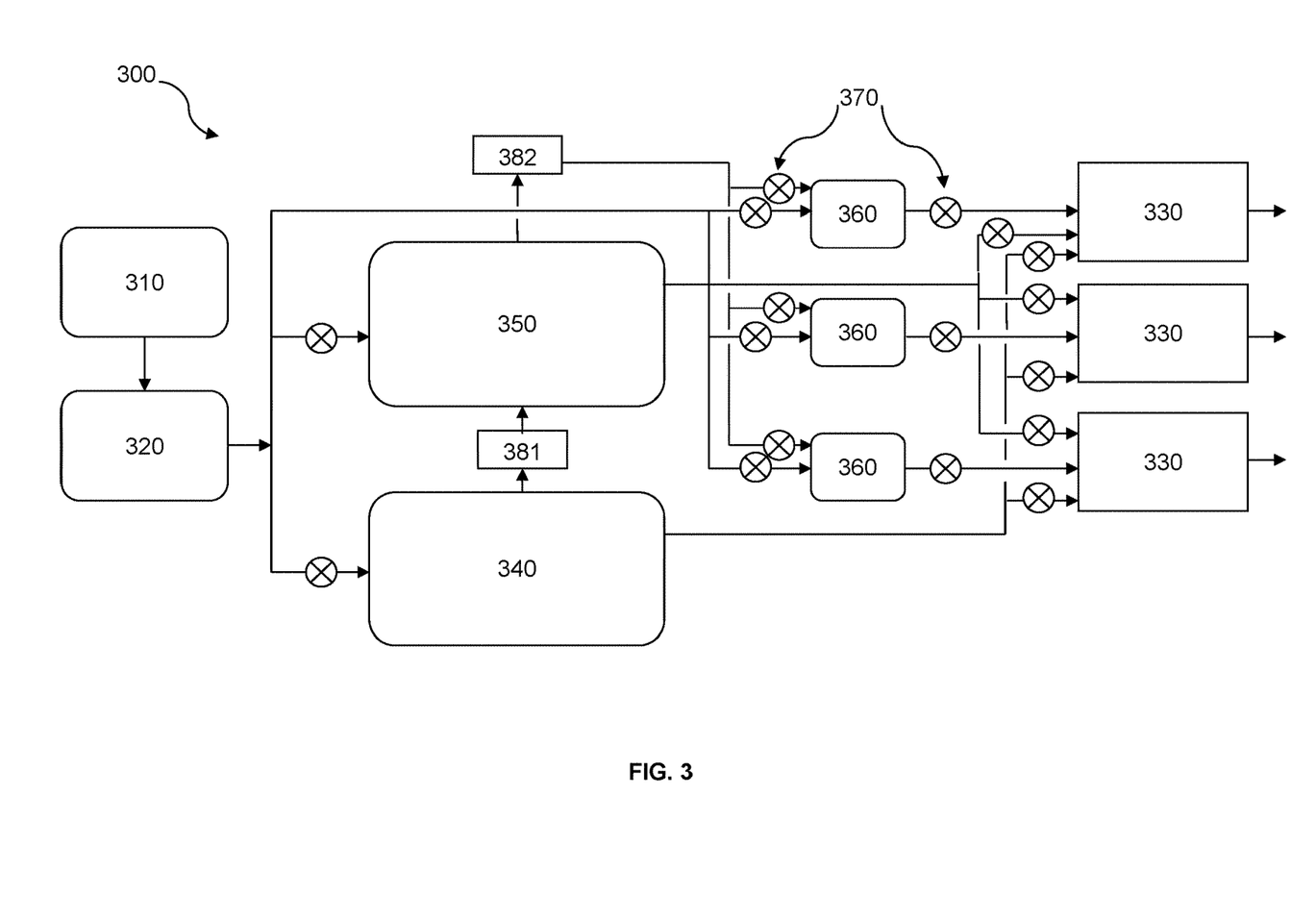
FIG. 3 shows a schematic diagram of a compressed fuel dispensing station, according to an exemplary embodiment.

FIG. 3 shows a schematic diagram of a CFDS 300, according to various embodiments. CFDS 300 can comprise a fuel source 310, a compressor 320, a plurality of fuel dispensing units 330, a plurality of low pressure compressed fuel reservoirs (LPCFR) 340, a plurality of medium pressure compressed fuel reservoir (MPCFR) 350, and a plurality of high pressure compressed fuel reservoirs (HPCFR) 360. As described previously, fuel source 310 can be in fluid communication with compressor 320, compressor 320 can be in fluid communication with LPCFR 320, MPCFR 350, and HPCFR 360, and various valves 370 can be positioned between components.

CFDS 300 can further comprise a plurality of compressors. For example, the plurality of compressors can be electrochemical hydrogen compressors (EHCs). In various embodiments, the plurality of compressors can take the form of mechanical compressors, ionic-liquid compressors or other comparable compression devices.

Plurality of EHCs can comprise a first EHC 381 and a second EHC 382. As shown in FIG. 3, first EHC 381 can be in fluid communication with LPCFR 340 and MPCFR 350. Accordingly, first EHC 381 can scavenge hydrogen from LPCFR 340 and compress the hydrogen and discharge it to MPCFR 350. In an alternate embodiment (not shown), first EHC 381 can be configured to discharge the compressed hydrogen directly to HPCFR 360.

As shown in FIG. 3, second EHC 382 can be in fluid communication with MPCFR 350 and HPCFR 360. Accordingly, second EHC 382 can scavenge hydrogen from MPCFR 350 and compress the hydrogen and discharge it to any one of HPCFR 360.

Figure 4:
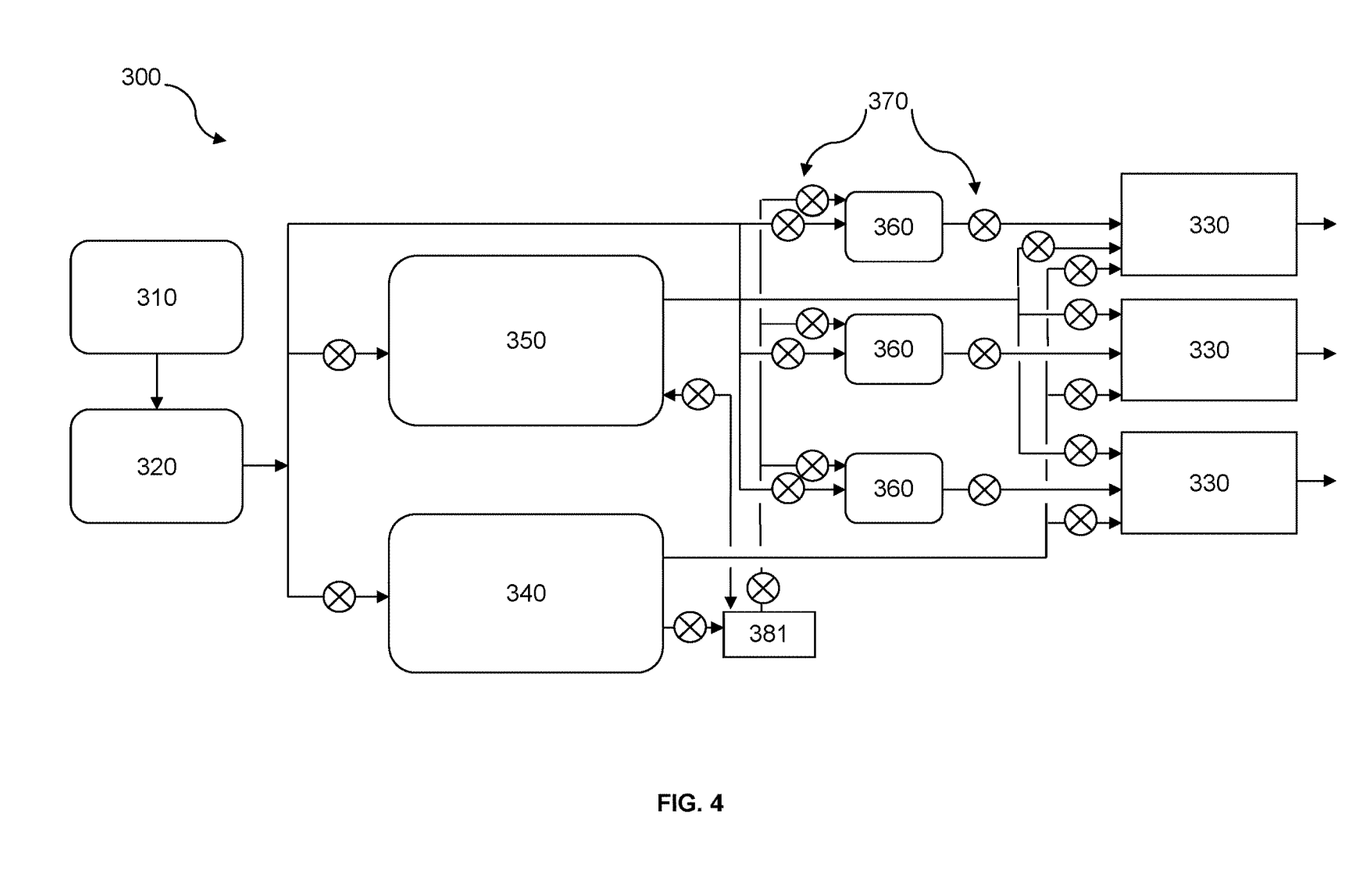
FIG. 4 shows a schematic diagram of a compressed fuel dispensing station, according to an exemplary embodiment.

CFDS 300 according to another embodiment is shown in FIG. 4. In FIG. 4 CFDS 300 has only a first EHC 381, which can be configured to scavenge hydrogen from LPCFR 340, MPCFR 350, or both and deliver that hydrogen to MPCFR 350, HPCFR 360, or both.

Utilizing one or more EHCs as part of CFDS 100, 200, or 300 can permit enhanced utilization of the stored fuel and improve the usable mass in a given compressed fuel dispensing station. For example, during a refueling event the vehicle is first connected to the low pressure reservoir and gas pressure is allowed to equalize between the reservoir and vehicle. Once equal pressure is achieved, no more gas flows from the reservoir to the vehicle and the connection must be switched to a reservoir with higher stored pressure to continue filling. This essentially leaves the gas remaining in the low pressure reservoir unavailable for delivery to the vehicle ("unutilized"). By employing a scavenging compressor, this unutilized fuel can be drawn out of the lower pressure reservoir, pumped into the higher pressure reservoir and made available for delivery to a vehicle. Scavenging significantly increases the availablitlity of stored molecules of fuel for delivery in contrast to a static cascade, where at least some molecules are necessarily abandoned.

Furthermore, use of EHCs can allow for increased top-off rate for HPCFR under high utilization situations because both the generated hydrogen flow and the scavenger flow can simultaneously refill the HPCFR. It is contemplated that EHC can be fluidly connected to the reservoirs in other arrangements. The above examples are not exhaustive of the potential arrangements, but instead are exemplary.

In other embodiments, the number of fuel reservoirs can be reduced to two (e.g., low pressure and high pressure) or increased to more than three (e.g., low pressure, medium pressure, high pressure, and extra-high pressure). The number of reservoir pressures can be optimized based on many factors, for example, size of reservoirs, specified vehicle max fill pressure, desired fill time, volume of vehicle traffic at station, performance of compressor, performance of electrochemical compressor, etc.

Figure 5:
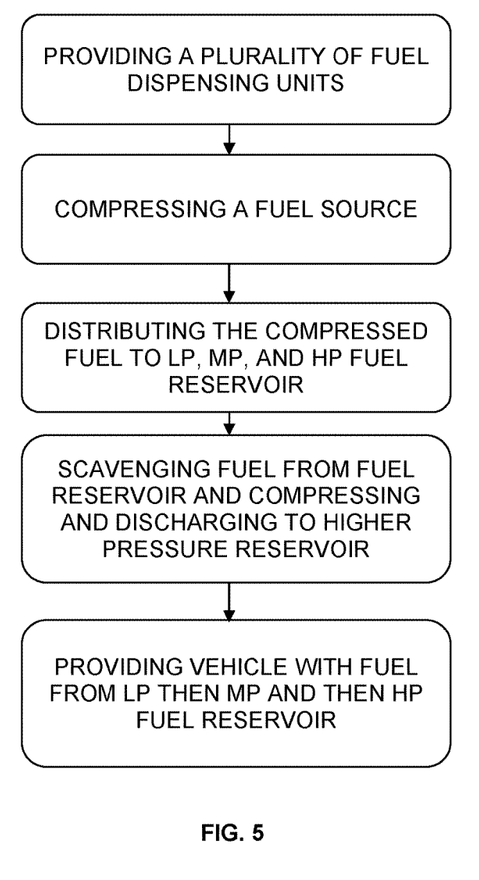
FIG. 5 shows a flow chart of a method of distributing compressed fuel from a dispensing station, according to an exemplary embodiment.

A method of distributed hydrogen refueling, according to an exemplary embodiment, is described with reference to FIG. 5. The method of distributed hydrogen refueling can be performed utilizing the compressed fuel dispensing systems 100, 200, and 300 as described above. The method can comprise providing a plurality of fuel dispensing units, compressing a fuel source, and distributing the compressed fuel to a low pressure compressed fuel reservoir, a medium pressure compressed fuel reservoir, and a high pressure compressed fuel reservoir. The method can further comprise scavenging fuel from one of the compressed fuel reservoirs, compressing the fuel using an electrochemical compressor, and discharging the fuel to one of the compressed fuel reservoirs of higher pressure. The method can further comprise supplying a vehicle with a fuel to full fill by first releasing low pressure fuel, then releasing medium pressure fuel, and then finally achieving full fill by releasing high pressure fuel into the vehicle. In addition, the method can include distributing the fuel based on priority and fuel dispensing unit utilization.

CFDS 100, 200, and 300 as described above can further comprise a plurality of instruments to monitor and control the various components of the station. In addition, CFDS 100, 200, and 300 can further comprise a control system (not shown) configured to monitor and control the station. The control system can comprise a computer, PLC, or other similar device. The control system can be in communication with the plurality of valves, plurality of instruments, and the other station components. The control system can calculate and control the dispensing station to achieve the above described prioritization. In addition, the plurality of instruments can include a sensor configured to sense the vehicle tank capacity and factor in the capacity to the prioritization calculation. In another embodiment, the plurality of instruments can include a sensor configured to monitor the status of each HPCFR 160 and display the status to a customer filling of their vehicle. By providing a status display for each HPCFR 160 a customer can factor the status into their pump selection decision.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of distributing compressed fuel from a dispensing station, comprising the steps of:
   compressing a fuel source;
   distributing the compressed fuel to at least one low pressure compressed fuel reservoir, at least one medium pressure compressed fuel reservoir, and a plurality of high pressure compressed fuel reservoirs; and
   supplying a compressed fuel at low pressure from the at least one low pressure compressed fuel reservoir, then at medium pressure from the at least one medium pressure compressed fuel reservoir, and then at high pressure from one of the plurality of high pressure compressed fuel reservoirs to one of a plurality of fuel dispensing units;
   wherein the at least one low pressure compressed fuel reservoir and the at least one medium pressure compressed fuel reservoirs are fluidly configured to supply compressed fuel to the plurality of fuel dispensing units; and
   wherein each of the plurality of fuel dispensing units is fluidly configured to receive compressed fuel from one of the plurality of high pressure compressed fuel reservoirs, which is dedicated to that individual fuel dispensing unit.

2. The method of distributing compressed fuel from a dispensing station of claim 1, further comprising:
   scavenging the compressed fuel from the at least one low pressure compressed fuel reservoirs and/or the at least one medium pressure compressed fuel reservoir;
   compressing the compressed fuel using a second compressor; and
   discharging the compressed fuel to at least one compressed fuel reservoirs of higher pressure.

3. The method of distributing compressed fuel from a dispensing station of claim 2, wherein the second compressor is configured to scavenge compressed fuel from the at least one low pressure compressed fuel reservoir and compress and discharge the compressed fuel into the at least one medium pressure compressed fuel reservoir.

4. The method of distributing compressed fuel from a dispensing station of claim 2, wherein the second compressor is configured to scavenge compressed fuel from the at least one low pressure compressed fuel reservoir and compress and discharge the compressed fuel into the plurality of high pressure compressed fuel reservoirs.

5. The method of distributing compressed fuel from a dispensing station of claim 2, wherein the second compressor is configured to scavenge compressed fuel from the at least one medium pressure compressed fuel reservoir and compress and discharge the compressed fuel into the plurality of high pressure compressed fuel reservoirs.

6. The method of distributing compressed fuel from a dispensing station of claim 2, wherein the second compressor is an electrochemical hydrogen compressor.

7. The method of distributing compressed fuel from a dispensing station of claim 1, further comprising:
   supplying a vehicle with a fuel to a full fill level by releasing low pressure compressed fuel from the at least one low pressure compressed fuel reservoir then releasing fuel at greater pressure from the at least medium pressure compressed fuel reservoir until achieving full fill by releasing high pressure fuel into the vehicle from one of the plurality of high pressure compressed fuel reservoirs and equalizing.

8. The method of distributing compressed fuel from a dispensing station of claim 1, wherein the compressor is configured to prioritize supplying fuel to a specific high pressure compressed fuel reservoir.

9. The method of distributing compressed fuel from a dispensing station of claim 1, wherein the fuel source includes at least one of hydrogen, natural gas, and propane.

10. The method of distributing compressed fuel from a dispensing station of claim 1, wherein the compressor is an electrochemical hydrogen compressor.

11. The method of distributing compressed fuel from a dispensing station of claim 1, wherein each high pressure compressed fuel reservoir has less volume capacity than the at least one low pressure compressed fuel reservoirs.

12. The method of distributing compressed fuel from a dispensing station of claim 1, wherein each high pressure compressed fuel reservoir has less volume capacity than the at least one medium compressed fuel reservoirs.

13. The method of distributing compressed fuel from a dispensing station of claim 1, wherein the at least one medium pressure compressed fuel reservoirs each have less volume capacity than the at least one low pressure compressed fuel reservoirs.

* * * * *